May 6, 1958  L. BERTELE  2,833,181
TELEPHOTO OBJECTIVE
Filed Oct. 18, 1956

United States Patent Office 2,833,181
Patented May 6, 1958

2,833,181
TELEPHOTO OBJECTIVE

Ludwig Bertele, Heerbrugg, Saint Gallen, Switzerland

Application October 18, 1956, Serial No. 616,743

Claims priority, application Switzerland November 2, 1955

3 Claims. (Cl. 88—57)

The present invention relates to a telephone objective consisting of three air-spaced components and showing a relative aperture of about 1:4 and an angle of view of about 25 to 30°. The objective is constructed of four single lenses arranged in such a manner that the positive element towards the object being composed of a biconvex and a biconcave lens, the second element forming a single biconvex lens and the third element being a single diverging lens bent towards the image. It proved that in spite of this small number of single lenses it is possible to construct an efficient objective which favourably can be applied in cameras with a rigidly built-in segment-shutter behind the objective due to a path of rays claiming but a small free diameter of the segment-shutter.

The conditions to be observed according to this invention are the following.

(a) $2F < f_{1+2} < 6F$
(b) $F > f_3 > 0.4F$
(c) $0.45F > p' > 0.27F$
(d) $1.20F > t_1 + t_2 + s_1 + t_3 + s_2 + t_4 + p' > 0.95F$ where $s_1$ and $s_2$ are the air spaces between the components,
$t_1$ to $t_4$ the thicknesses of the lenses,
$f_{1+2}$ the focal length of the first component ($L_1$ and $L_2$)
$f_3$ the focal length of the second component ($L_3$)
$p'$ the distance between the rear surfaces ($r_7$) of the objective and the image
$F$ the total focal length of the objective.

Figure 1:
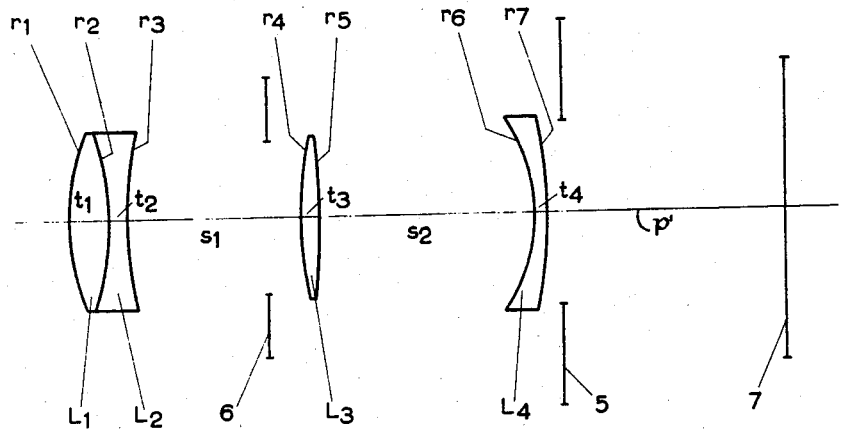
Figure 2:
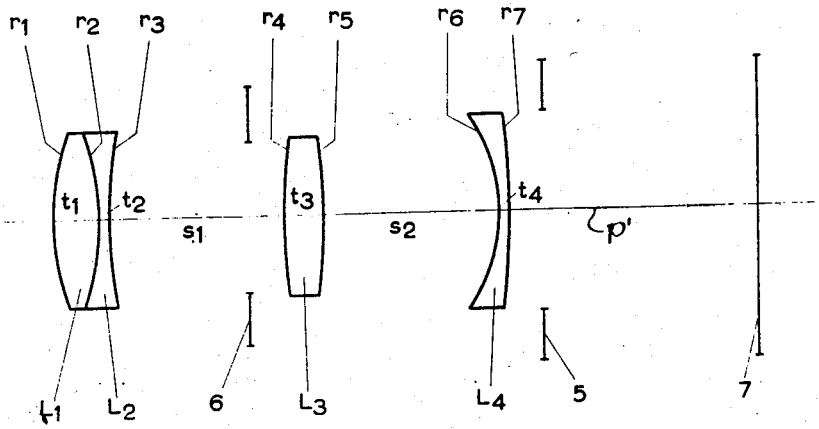

An objective embodying the present invention is given in Examples 1 and 2 and illustrated in the respective Figures 1 and 2. $L_1$ to $L_4$ are the respective lens elements. The radii of curvature ($r$), the thicknesses of lenses ($t$) and the axial air distances ($s$) are consecutively numbered from the object. The diaphragm is denoted by symbol 5, the shutter by 6 and the image by 7. The glasses of the lenses forming the objective are characterized by the refraction index for the $d$-line $n_d$ in connexion with their colour dispersion by the Abbe numbers $v$.

The lenses $L_1$ and $L_2$ can be uncemented single lenses.

Example 1

[Relative aperture 1:4. Focal length 100 mm. $p'$ 36.1 mm.]

| | | | | |
|---|---|---|---|---|
| $L_1$ | $r_1 = + 34.80$ | $t_1 = 5.79$ | $n_d = 1.52542$ | $v = 64.5$ |
| | $r_2 = - 42.63$ | | | |
| $L_2$ | $r_3 = + 64.55$ | $t_2 = 1.89$ | $n_d = 1.66755$ | $v = 41.9$ |
| | | $s_1 = 26.11$ | | |
| | $r_4 = + 62.95$ | | | |
| $L_3$ | $r_5 = -182.82$ | $t_3 = 2.63$ | $n_d = 1.69100$ | $v = 54.8$ |
| | | $s_2 = 31.89$ | | |
| | $r_6 = - 25.79$ | | | |
| $L_4$ | $r_7 = - 72.08$ | $t_4 = 1.58$ | $n_d = 1.54814$ | $v = 45.9$ |

Example 2

[Relative aperture 1:4. Focal length 100 mm. $p'$ 36.1 mm.]

| | | | | |
|---|---|---|---|---|
| $L_1$ | $r_1 = + 36.84$ | $t_1 = 6.84$ | $n_d = 1.52000$ | $v = 63.6$ |
| | $r_2 = - 41.05$ | | | |
| $L_2$ | $r_3 = + 86.71$ | $t_2 = 2.42$ | $n_d = 1.66755$ | $v = 41.9$ |
| | | $s_1 = 26.11$ | | |
| | $r_4 = + 72.63$ | | | |
| $L_3$ | $r_5 = -120.56$ | $t_3 = 6.32$ | $n_d = 1.69100$ | $v = 54.8$ |
| | | $s_2 = 25.79$ | | |
| | $r_6 = - 27.24$ | | | |
| $L_4$ | $r_7 = -136.86$ | $t_4 = 1.58$ | $n_d = 1.54814$ | $v = 45.9$ |

What I claim and desire to secure by Letters Patent of the United States is:

1. A telephoto objective fully corrected for the different errors of image, said objective comprising four lenses divided into three air-spaced components, the front component being positive and being composed of a biconvex and a biconcave lens, the middle component being a single biconvex lens and the third component being a single diverging lens and bent towards the image, in which—

$s_1$ and $s_2$ are the air spaces between the components,
$t_1$ to $t_4$ the thickness of the lenses,
$f_{1+2}$ the focal length of the first component ($L_1$ and $L_2$),
$f_3$ the focal length of the second component ($L_3$),
$p'$ the distance between the rear surface ($r_7$) of the objective and the image,
$F$ the total focal length of the objective, and which are within the limits specified in the following algebraic relationship:

(a) $2F < f_{1+2} < 6F$
(b) $F > f_3 > 0.4F$
(c) $0.45F > p' > 0.27F$
(d) $1.20F > t_1 + t_2 + s_1 + t_3 + s_2 + t_4 + p' > 0.95F$

2. A fully corrected 100 mm. focal length telephoto objective having substantially the following characteristics:

| | | | | |
|---|---|---|---|---|
| $L_1$ | $r_1 = + 34.80$ | $t_1 = 5.79$ | $n_d = 1.52542$ | $v = 64.5$ |
| | $r_2 = - 42.63$ | | | |
| $L_2$ | $r_3 = + 64.55$ | $t_2 = 1.89$ | $n_d = 1.66755$ | $v = 41.9$ |
| | | $s_1 = 26.11$ | | |
| | $r_4 = + 62.95$ | | | |
| $L_3$ | $r_5 = -182.82$ | $t_3 = 2.63$ | $n_d = 1.69100$ | $v = 54.8$ |
| | | $s_2 = 31.89$ | | |
| | $r_6 = - 25.79$ | | | |
| $L_4$ | $r_7 = - 72.08$ | $t_4 = 1.58$ | $n_d = 1.54814$ | $v = 45.9$ |

Wherein are:

$L_1$–$L_4$ the respective lens elements
$r_1$–$r_7$ the radii of curvature
$t_1$–$t_4$ the thicknesses of the lenses
$s_1$ and $s_2$ the air spaces between the lenses
$n_d$ the refractive index for the $d$-line
$v$ the Abbe number.

3. A fully corrected 100 mm. focal length telephoto objective having substantially the following characteristics:

| | | | | |
|---|---|---|---|---|
| $L_1$ | $r_1 = + 36.84$ | $t_1 = 6.84$ | $n_d = 1.52000$ | $v = 63.6$ |
| | $r_2 = - 41.05$ | | | |
| $L_2$ | $r_3 = + 86.71$ | $t_2 = 2.42$ | $n_d = 1.66755$ | $v = 41.9$ |
| | | $s_1 = 26.11$ | | |
| | $r_4 = + 72.63$ | | | |
| $L_3$ | $r_5 = -120.56$ | $t_3 = 6.32$ | $n_d = 1.69100$ | $v = 54.8$ |
| | | $s_2 = 25.79$ | | |
| | $r_6 = - 27.24$ | | | |
| $L_4$ | $r_7 = -136.86$ | $t_4 = 1.58$ | $n_d = 1.54814$ | $v = 45.9$ |

Wherein are:

$L_1$–$L_4$ the respective lens elements
$r_1$–$r_7$ the radii of curvature
$t_1$–$t_4$ the thicknesses of the lenses
$s_1$ and $s_2$ the air spaces between the lenses
$n_d$ the refractive index for the $d$-line
$\nu$ the Abbe number.

References Cited in the file of this patent

UNITED STATES PATENTS

| 560,460 | Aldis | May 19, 1896 |
| 2,662,446 | Tronnier | Dec. 15, 1953 |
| 2,762,262 | Bertele | Sept. 11, 1956 |

FOREIGN PATENTS

| 492,311 | Great Britain | Sept. 19, 1938 |